US012384666B2

(12) United States Patent
Voss et al.

(10) Patent No.: US 12,384,666 B2
(45) Date of Patent: Aug. 12, 2025

(54) EXTENDABLE NEEDLE DAVIT ASSEMBLY

(71) Applicant: SAYFA R&D PTY LTD, Boronia (AU)

(72) Inventors: Barry Voss, Boronia (AU); Murray Voss, Boronia (AU)

(73) Assignee: SAYFA R&DPTY LTD, Boronia (AU)

( * ) Notice: Subject to any disclaimer, the term of this patent is extended or adjusted under 35 U.S.C. 154(b) by 0 days.

(21) Appl. No.: 18/001,927

(22) PCT Filed: Aug. 19, 2022

(86) PCT No.: PCT/AU2022/050925
§ 371 (c)(1),
(2) Date: Dec. 15, 2022

(87) PCT Pub. No.: WO2023/019319
PCT Pub. Date: Feb. 23, 2023

(65) Prior Publication Data
US 2024/0124274 A1 Apr. 18, 2024

(30) Foreign Application Priority Data
Aug. 20, 2021 (AU) ................................ 2021902622

(51) Int. Cl.
*B66C 23/04* (2006.01)
*B66C 23/20* (2006.01)
*B66C 23/70* (2006.01)

(52) U.S. Cl.
CPC ............ *B66C 23/04* (2013.01); *B66C 23/205* (2013.01); *B66C 23/701* (2013.01)

(58) Field of Classification Search
CPC ..... B66C 23/04; B66C 23/205; B66C 23/701; B66C 23/202; B66C 23/26
See application file for complete search history.

(56) References Cited

U.S. PATENT DOCUMENTS 1,551,132 A 8/1925 Butler
2,446,093 A 7/1948 Lambert
(Continued)

FOREIGN PATENT DOCUMENTS

AU 2020104271 A4 3/2021
CN 213572947 U 6/2021
(Continued)

OTHER PUBLICATIONS

Supplementary European Search Search Report dated May 23, 2024 from Application No. 22818168.1 (11 pages).
(Continued)

*Primary Examiner* — Anna M Momper
*Assistant Examiner* — Juan J Campos, Jr.
(74) *Attorney, Agent, or Firm* — INNOVATION CAPITAL LAW GROUP, LLP; Vic Lin

(57) ABSTRACT

An extendable needle davit assembly has an extendable beam comprising a fixed beam portion, and a telescopic beam portion slidably receivable within a distal end of the fixed beam portion. An intermediate lateral bracing frame holds the extendable beam at an angle. The fixed beam portion is a single-piece construction, and a proximal end of the fixed beam portion is anchored. An upper end of the bracing frame is attached to a distal attachment point of the fixed beam portion, such that a distal portion of the fixed beam portion extends beyond the bracing frame. A lower portion of the bracing frame is attached to a proximal attachment point of the fixed beam portion by means of a rear brace.

37 Claims, 10 Drawing Sheets

(56) References Cited

U.S. PATENT DOCUMENTS

| | | | | | |
|---|---|---|---|---|---|
| 2,569,821 | A | | 10/1951 | Fredrick | |
| 2,772,789 | A | * | 12/1956 | Hussong | B66C 23/72 212/299 |
| 2,928,564 | A | * | 3/1960 | Figge | B66C 23/205 414/657 |
| 3,910,379 | A | | 10/1975 | Miller et al. | |
| 4,135,627 | A | * | 1/1979 | McInerney | B66C 23/48 254/285 |
| 4,508,233 | A | | 4/1985 | Helms | |
| 4,621,741 | A | * | 11/1986 | Boon | B66C 23/205 212/175 |
| 5,622,237 | A | * | 4/1997 | Moldow | B66C 23/205 212/224 |
| 9,505,590 | B2 | * | 11/2016 | Chen | E04G 3/34 |
| 11,472,241 | B2 | * | 10/2022 | Baik | B60D 1/025 |

FOREIGN PATENT DOCUMENTS

| | | | |
|---|---|---|---|
| DE | 1044371 | B | 11/1958 |
| WO | 2019100180 | A1 | 5/2019 |

OTHER PUBLICATIONS

International Search Report & Written Opinion dated Oct. 11, 2022 from PCT Application No. PCT.AU2022/050925.

International type search dated Sep. 16, 2021 from Australian Application No. 2021902622.

* cited by examiner

EXTENDABLE NEEDLE DAVIT ASSEMBLY

CROSS REFERENCE TO RELATED APPLICATIONS

This is a U.S. National Phase Application under 35 U.S.C. § 371 of International Application No. PCT/AU2022/050925, filed Aug. 19, 2022, which claims priority to Australian Application Nos. 2021902622, filed Aug. 20, 2021, which were published Under PCT Article 21 (2), the entire contents of which are incorporated herein by reference.

FIELD OF THE INVENTION

This invention relates generally to an extendable needle davit assembly for elevated rope access for construction and maintenance personnel working at height on buildings and structures.

BACKGROUND OF THE INVENTION

Davit systems are portable lightweight anchoring device used in elevated rope access and abseil applications. Needle davit systems protrude over the parapet or façade of a building or the wall or edge of a structure, to provide a secure anchorage for abseiling, typically for maintenance purposes.

U.S. Pat. No. 2,446,093 A (Lambert) 27 Jul. 1948 discloses a frame for supporting hoisting apparatus which is particularly adapted for use upon the roofs of buildings, for elevating building materials and other goods. The hoist frame is universally adjustable and thus adaptable for use on buildings in which the roofs may be either fiat or pitched, and on which the copings and fire walls may vary both in height and thickness. The hoist frame comprises an extendable boom made of telescoping tubular parts having a distal part intended to extend beyond the edge of a roof, where it is provided with an eye for the attachment of a block and tackle.

U.S. Pat. No. 5,622,237 A (Moldow) 22 Apr. 1997 discloses a portable hoist system suitable for mounting to a pair of rails and includes a vertical support. The system has an inclined boom connected to the vertical support and a hoist secured to the boom. Clamping members are provided at the lower ends of the vertical support and the boom for detachably mounting to the rails. The hoist system is foldable for transport or storage purposes.

WO 2019/100180 A1 (Kao) 31 May 2019 discloses a support bracket structure for a deploying/stowing type suspension apparatus. The structure has a loading box which can be movably placed on a building roof floor. A suspension arm has one end pivotally provided on the loading box, and a support bracket having a connecting seat pivotally connected to the suspension arm. The structure has support legs one on either side of the other end of the connecting seat, which stand on the building roof floor in a V-shape. The suspension arm is inclined and bridges the loading box and the support bracket, with the two support legs and building roof floor forming an isosceles triangular support structure. The support bracket structure for the apparatus can overcome problematic transport difficulties.

The present invention seeks to provide an extendable needle davit assembly, which will overcome or substantially ameliorate at least some of the deficiencies of the prior art, or at least to provide an alternative.

It is to be understood that, if any prior art information is referred to herein, such reference does not constitute an admission that the information forms part of the common general knowledge in the art, either in Australia or any other country.

SUMMARY OF THE DISCLOSURE

There is provided an extendable needle davit assembly which is designed as an elevated rope access anchorage device, where abseil access over non load bearing parapets, balustrades and light weight curtain walls of buildings and structures is required for personnel working at height.

Rope access is commonly required for building inspections and general maintenance of external facades, windows and equipment that cannot be accessed from a platform or enclosed safety system.

The extendable needle davit assembly is designed to withstand a 12 kN rope access load and have a serviceability load limit of 400 kg, for use by a single operator at any one time.

The extendable needle davit assembly operates well on metal deck roofs where the static and dynamic loads imposed on the roof deck, are required to be spread across the roofing area to avoid damaging or lifting the roof sheets.

The extendable needle davit assembly is also modular in design and can be configured in length, reach and travel, thereby providing a customised solution tailored to the specific requirements of a particular project.

In accordance with an embodiment, the extendable needle davit assembly comprises an extendable beam comprising a fixed beam portion, and a telescopic beam portion slidably receivable within a distal end of the fixed beam portion. The assembly further comprises an intermediate lateral bracing frame.

The fixed beam portion has a fixed (i.e. non-telescopic) construction between the anchor and the lateral bracing frame.

An upper end of the bracing frame is attached to a distal attachment point of the fixed beam portion. A distal portion of the fixed beam portion may extend just beyond the bracing frame.

A lower portion of the bracing frame is attached to a proximal attachment point of the fixed beam portion by means of a rear brace.

As such, the present assembly is telescopically adjustable beyond the bracing frame, thereby allowing for convenient length and reach adjustment, without repositioning or length adjustment of the bracing frame, in contradistinction to the arrangement taught by Lambert which has telescopic adjustment rearward of the support frame.

Furthermore, the fixed (i.e. non-telescopic) construction of the main load bearing fixed beam enhances the structural integrity and therefore load rating capacity of the extendable needle davit assembly, wherein the present rope access load rating is 12Kn, in contradistinction to the arrangement taught by Lambert which compromises loadbearing capacity by means of telescopic componentry rearward of the support frame. Both Moldow and Kao have similarly compromised loadbearing capacity configurations.

The present extendable needle davit assembly may be assembled by inserting portions thereof between bifurcated portions of interconnecting pieces, and which are secured using locating pins. This modular arrangement facilitates quick, convenient and secure slot-in assembly as illustrated in FIG. 16.

Furthermore, the proximal end of the extendable beam is preferably anchored by means of a swivel anchor, whereas the intermediate bracing frame is not anchored so that both the bracing frame and the extendable beam can be lifted together, for repositioning over the building parapet or façade, as the extendable beam swivels with respect to the swivel bracket as illustrated in FIG. 17.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
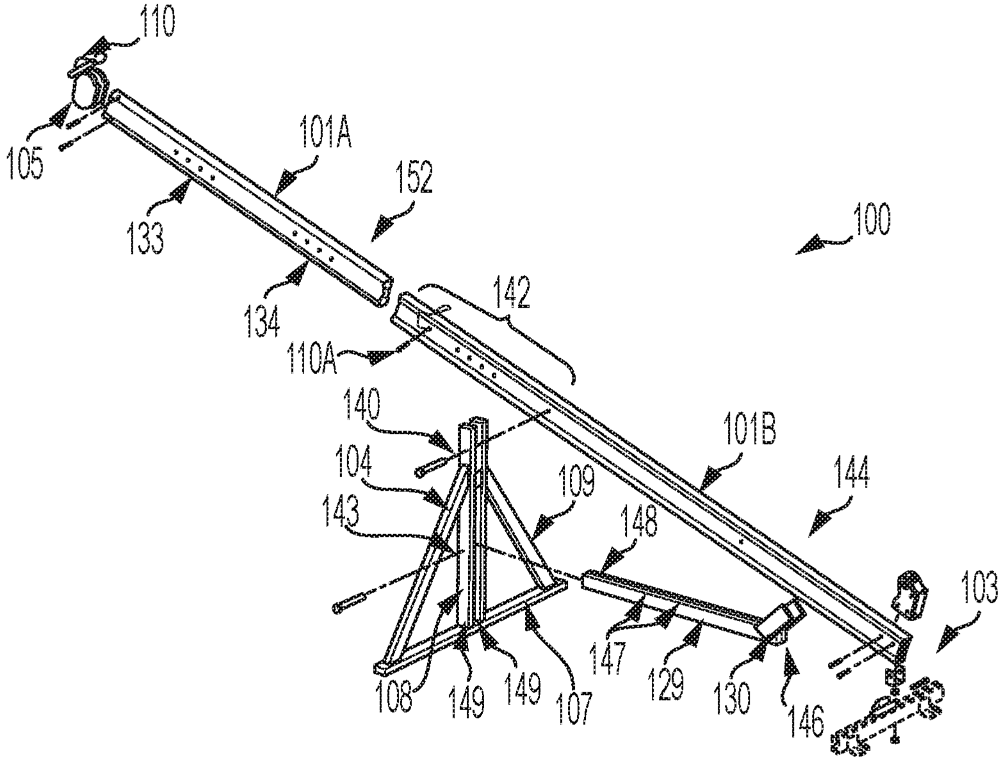
FIG. 1 shows an exploded perspective view of an extendable needle davit assembly in accordance with an embodiment.
Figure 2:
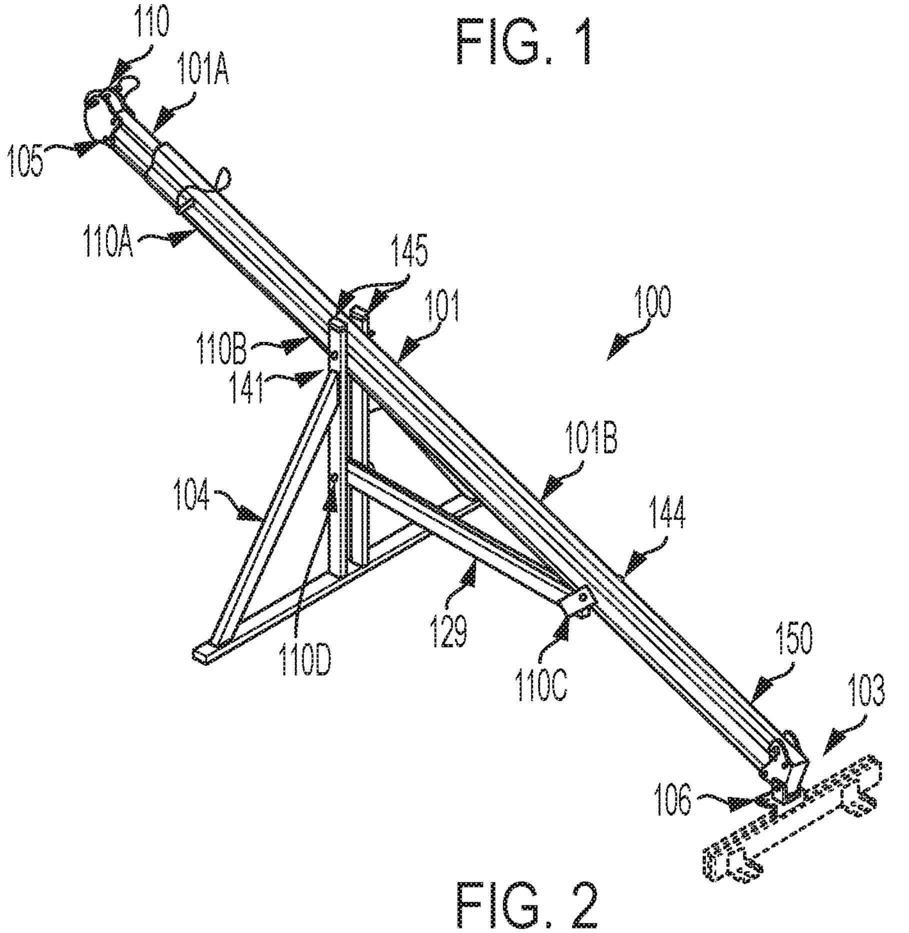
FIG. 2 shows an assembled perspective view of the davit assembly.

With reference to FIGS. 1 and 2 an extendable needle davit assembly 100 comprises an extendable beam 101 comprising a fixed beam portion 101B and a telescopic beam portion 101A.

Figure 3:
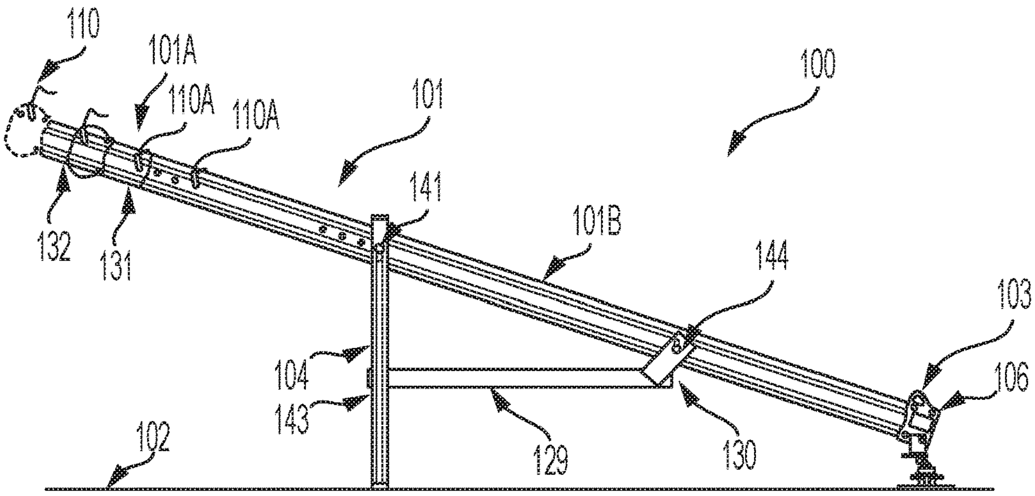
FIG. 3 shows a symmetrical left and right side view of the davit assembly.
Figure 4:
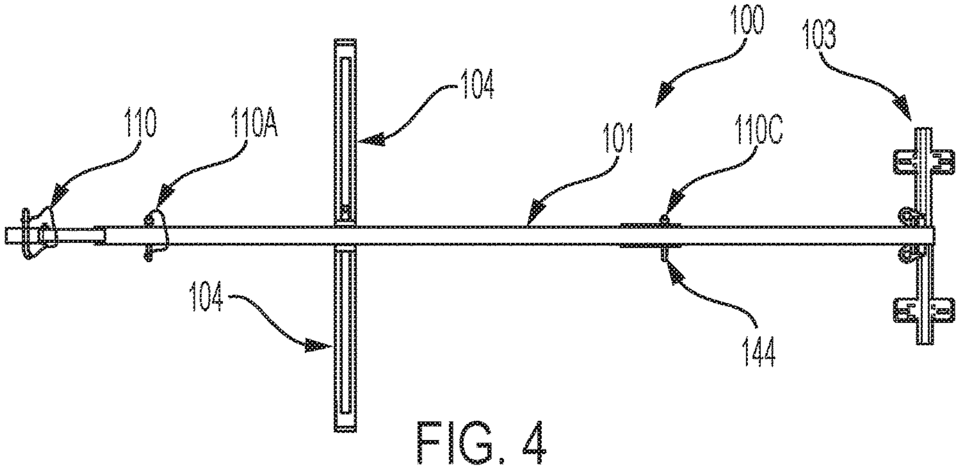
FIG. 4 shows a top plan view of the davit assembly.
Figure 5:
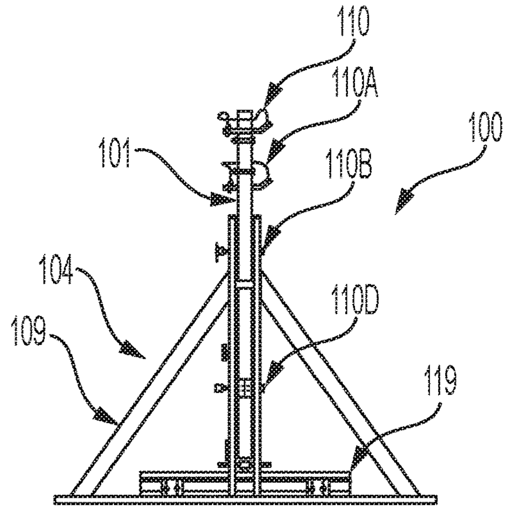
FIG. 5 shows a distal end view of the davit assembly.

Given the orientation of FIG. 3 for orientational referencing, proximal is at or towards the right of the davit assembly 100, and distal is at or towards the left.

The telescopic beam portion 101A is slidably receivable within a distal end of the fixed beam portion 101B.

The davit assembly 100 further comprises an intermediate lateral bracing frame 104.

Furthermore, a proximal end of the fixed beam portion 101B is anchored to an anchor, such as from a rear mount 103 in embodiments.

The bracing frame 104 may be of an all-welded construction, comprising RHS section aluminium extrusion members. An upper end 140 of the bracing frame 104 is attached to a distal attachment point 141 of the fixed beam portion 101B. A distal portion 142 of the fixed beam portion 101B may extend beyond the bracing frame 104.

The fixed beam portion 101B is non-telescopic, thereby conferring structural integrity between the anchor 103 and the distal attachment point 141. Preferably, the fixed beam portion 101B is a single piece construction and, in this regard, may be formed from an extrusion process and may further comprise aluminium.

A lower portion 143 of the bracing frame 104 is attached to a proximal attachment point 144 of the fixed beam portion 101B via a rear brace 129.

The positioning of the bracing frame 104 is preferably such that a ratio of the rear span (between the distal attachment point 141 and the proximal end 150 of the fixed beam portion 101B), to the cantilever span (between the distal attachment point 141 and a distal end of the telescopic beam portion 101A), is a minimum of 1.5.

Preferably, the rear brace 129 is of fixed length.

Preferably, the upper end 140 of the bracing frame 104 is bifurcated and open-ended, and wherein the fixed beam portion 101B slots between the bifurcated portions 145 thereof for attachment.

An intermediate locating pin 110B may fit through the bifurcated portions 145 and the fixed beam portion 101B therebetween.

Furthermore, a proximal end 146 of the rear brace 129 may also be bifurcated and open-ended, and wherein the fixed beam portion 101B slots between the bifurcated portions of attachment bracket 130. A proximal locating pin 110C may fit through the bifurcated portions and the fixed beam portion 101B therebetween. The rear brace 129 is of an all-welded construction comprising a pair of RHS section aluminium extrusion members 147, with an attachment bracket 130 comprising a pair of aluminium plates welded thereto at the proximal end 146 thereof to form the bifurcated portions.

The lower portion 143 of the bracing frame 104 may further be bifurcated and wherein a distal end 148 of the rear brace 129 inserts between the bifurcated portions 149 thereof. A lower locating pin 110D may fit through the bifurcated portions 149 and the distal end 148 of the rear brace 129 therebetween. As shown in FIG. 3, the rear brace 129 may be substantially orthogonal with respect to the lateral bracing frame 104 to enhance structural integrity.

According to the above configuration, the lateral bracing frame 104, rear brace 129 and fixed beam portion 101B may be attachable using only three locating pins 110B, 110C and 110D.

Figure 7:
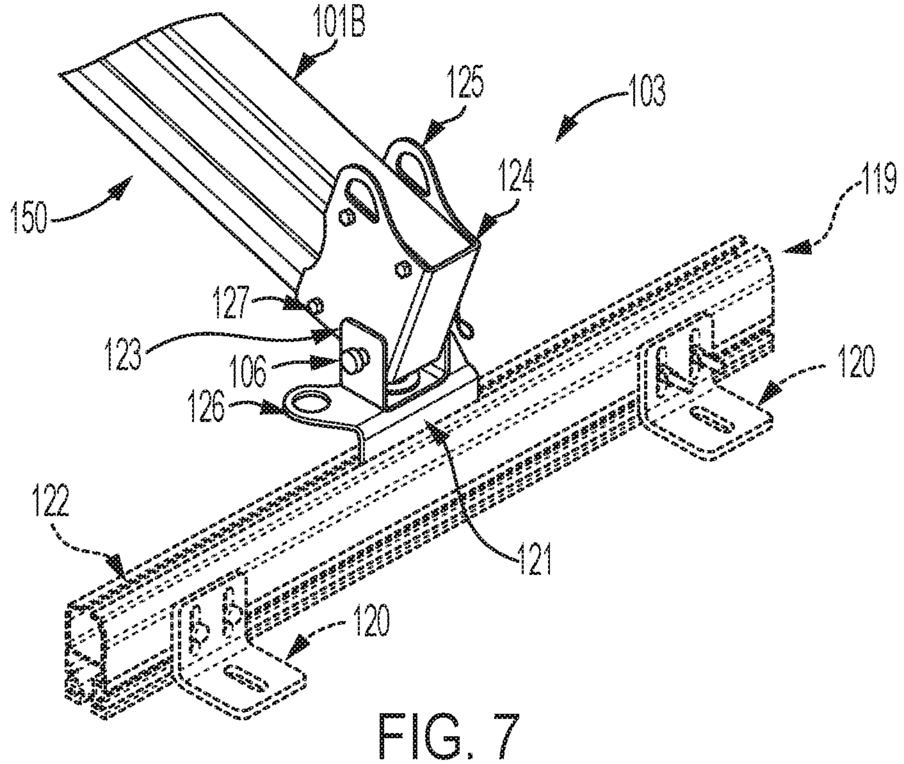
FIG. 7 shows an assembled perspective view of a rear mount in accordance with an embodiment.
Figure 12:
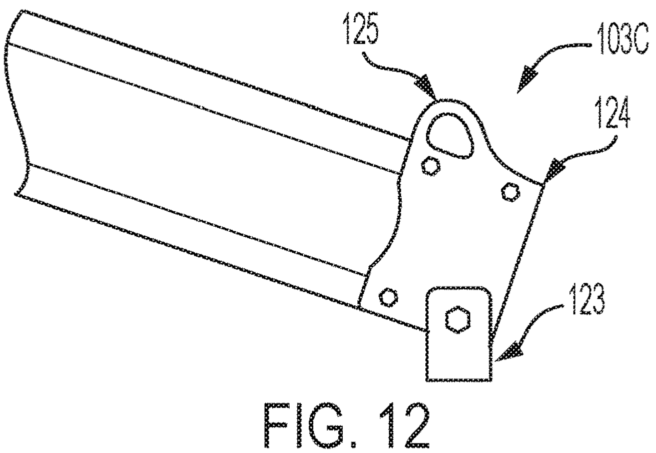
FIG. 12 shows a symmetrical side view of a rear mount in accordance with a yet further embodiment.
Figure 17:
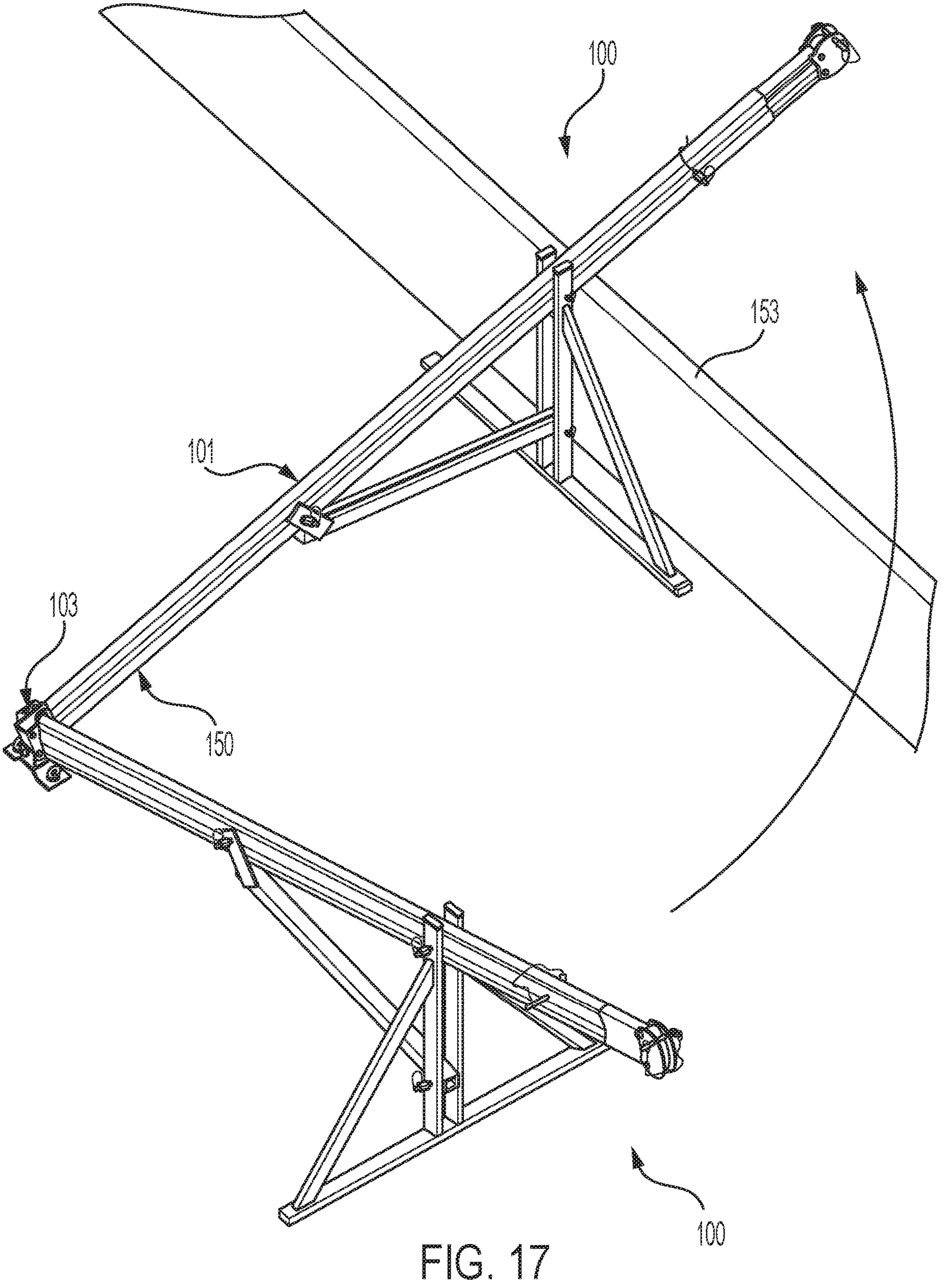

As shown in FIGS. 7, 12 and 17, the proximal end 150 of the inclined extendable beam 101 may be anchored using a swivel bracket 123.

Furthermore, the bracing frame 104 may comprise a base member 107 which is not attached to the surface 102. In the embodiment shown, the base member 107 of the bracing frame 104 may be longitudinal and orientated orthogonally with respect to the extendable beam 101, and from which a pair of upright members 108 extend perpendicularly, thereby defining the aforedescribed bifurcated portions 145 and 149, for the attachment of the fixed beam portion 101B and the distal end 148 of the rear brace 129 respectively. Angled side brace members 109 may brace the upper end 140 of the bracing frame 104 from both ends of the base member 107.

Because the base member 107 is not anchored to the surface 102, the bracing frame 104 can be lifted with the extendable beam 101, as the extendable beam 101 swivels with respect to the swivel bracket 123.

With reference to FIG. 3, the telescopic beam portion 101A is slidable with respect to the fixed beam portion 101B between an extended position 132 and a retracted position 131.

Figure 16:
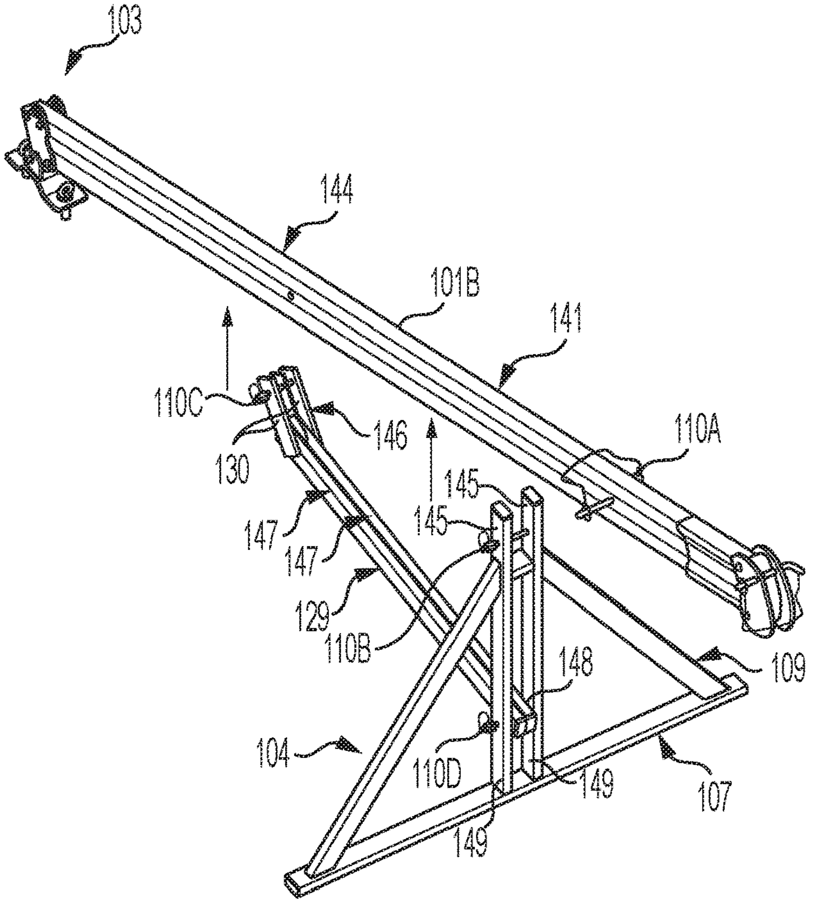

FIGS. 2 and 16 show an embodiment wherein the telescopic beam portion 101A is relatively shorter. In accordance with this embodiment, in the retracted position 131 a proximal end 152 of the telescopic beam portion 101A does not cross the distal attachment point 141 of the fixed beam portion 101B. As such, the length of the extendable beam 101 may be reconfigured by manipulating only one distal locating pin 110A between the telescopic beam portion 101A and the fixed beam portion 101B, without manipulating the intermediate locating pin 110B at the distal attachment point 141.

In accordance with this embodiment, the telescopic beam portion 101A and the fixed beam portion 101B may comprise a distal series of apertures 133, which collocate at more than one position of the telescopic beam portion 101A with respect to the fixed beam portion 101B, for the distal locating pin 110A to be inserted therethrough.

Figure 15:
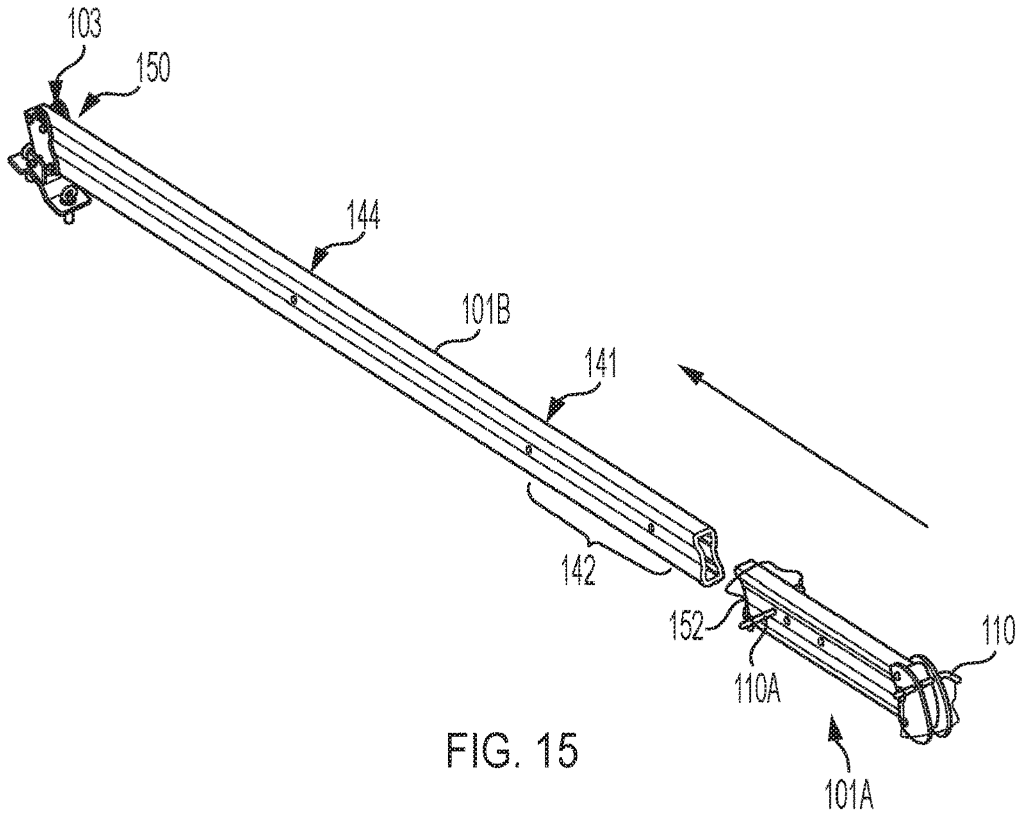
FIGS. 15-17 illustrate assembly and deployment of the present extendable needle davit assembly.

FIGS. 1 and 15 however show an alternative embodiment wherein the telescopic beam portion 101A is relatively longer. In accordance with this embodiment, in the retracted position 131 the proximal end 152 of the telescopic beam portion 101A does cross the distal attachment point 141. In embodiments, the telescopic beam portion 101A may be sufficiently long, so that even in the extended position 132 the proximal end 152 of the telescopic beam portion 101A crosses the distal attachment point 141.

In accordance with this embodiment, the extendable needle davit assembly 100 has further reach, and wherein the offset of the telescopic beam portion 101A may be adjusted with respect to the fixed beam portion 101B, by manipulating both the distal locating pin 110A between the telescopic beam portion 101A and the fixed beam portion 101B, and the intermediate locating pin 110B at the distal attachment point 141.

In accordance with this embodiment, the telescopic beam portion 101A and the fixed beam portion 101B may comprise a further series of apertures 134 which collocate at more than one position of the telescopic beam portion 101A with respect to the fixed beam portion 101B, for the intermediate locating pin 110B to be inserted therethrough. As such, the intermediate locating pin 110B inserts through the bifurcated portions 145 of the upper end 140 of the bracing frame 104, the distal attachment point 141 of the fixed beam portion 101B and the collocating apertures 134 of the telescopic beam portion 101A.

The extendable needle davit assembly 100 may be quickly assembled, constructed and positioned over a building parapet or structure edge, in the manner shown in FIGS. 15 to 17.

Specifically, FIG. 15 shows wherein the proximal end 150 of the fixed beam portion 101B is attached to the swivel bracket 123. The telescopic beam portion 101A can then be inserted into the open distal portion 142 of the fixed beam portion 101B.

FIG. 16 shows the rear brace 129 attached to the bracing frame 104, by slotting the distal end 148 of the rear brace 129 between the lower bifurcated portions 149 of the bracing frame 104, and inserting the lower locating pin 110D therethrough.

The fixed beam portion 101B can then easily be slotted into the connection plates 130 of rear brace 129, and between the bifurcated portions 145 of bracing frame 104, and wherein the respective proximal and intermediate locating pins 110C and 110B, are inserted through the respective proximal and distal attachment points 144 and 141.

FIG. 17 shows wherein the constructed extendable needle davit assembly 100 can then be swivelled about the swivel bracket 123, and positioned over the building parapet or structure edge 153.

The telescopic beam portion 101A may then be drawn out to the extended position 132 by manipulating the distal locating pin 110A, without having to reposition the bracing frame 104.

Figure 13:
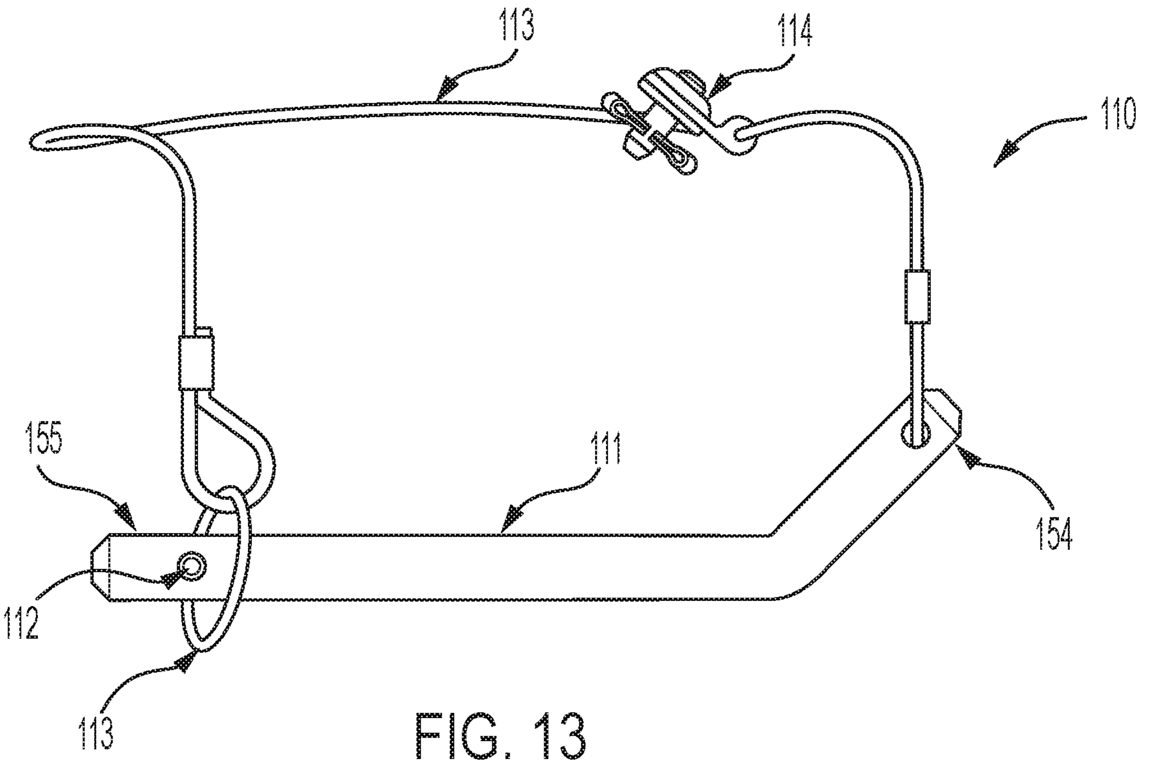
FIG. 13 shows a locating pin in accordance with an embodiment.
Figure 14:
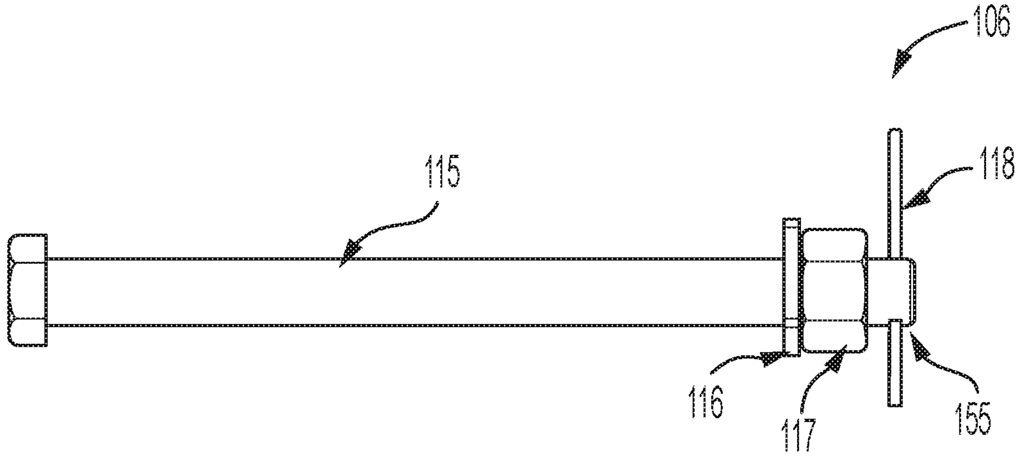
FIG. 14 shows a common bolt fastener in accordance with an embodiment.

FIG. 13 shows an embodiment wherein the locating pin 110 takes the form of a hand-operable locating pin 110 suited for quick release, whereas FIG. 14 shows a further embodiment wherein the locating pin 110 takes the form of a locking bolt 106 for a more permanent installation.

As shown in FIG. 13 the locating pin 110 comprises a shaft 111, locking pin 112 and safety device 114, retaining ring and short wire lanyard 113.

According to the configuration of FIG. 13, the locating pin 110 has a minor end 154 angled from the shaft 111, and a distal end 155 which is secured by a locking pin 112 therethrough. The locating pin 110 in accordance with this embodiment, may be used for the series of distal or proximal apertures 133 or 134 respectively, collocating between the telescopic beam portion 101A and the fixed beam portion 101B, for quick release and rapid adjustment of the length of the extendable beam 101.

Figure 8:
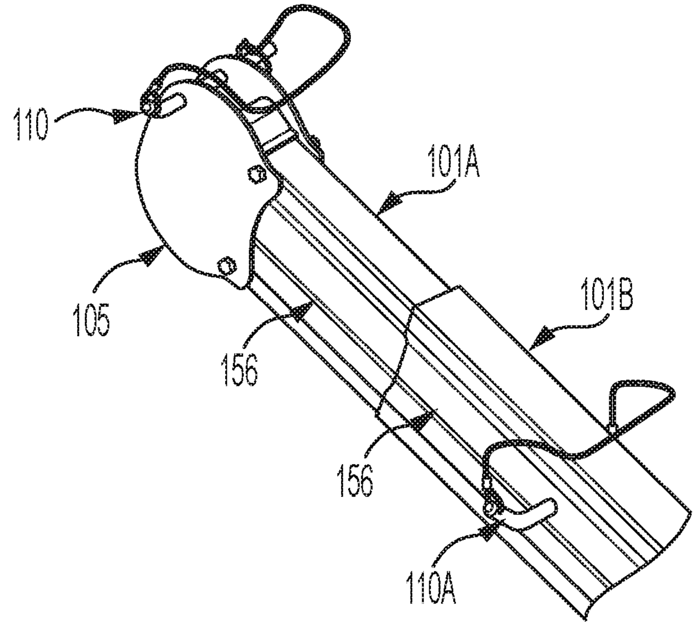
FIG. 8 shows a magnified perspective view of a distal portion of both the structural and extension beams.
Figure 9:
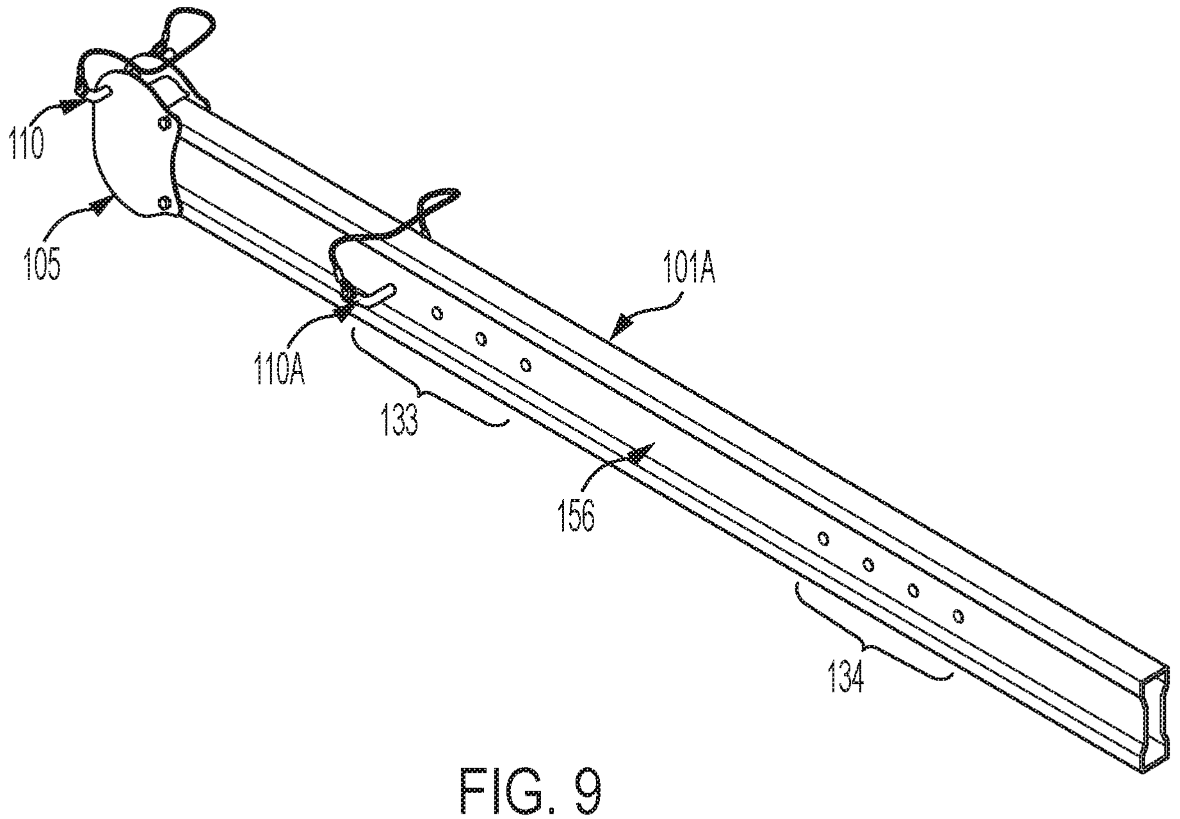
FIG. 9 shows a perspective view of the extension beam in accordance with an embodiment.

As shown in FIGS. 8 and 9, the shaft 111 of locating pin 110 may be inserted through the collocating apertures 133 or 134. Once through, the distal end 155 of the shaft 111 may be secured by means of the locking pin 112 and a retaining ring and short wire lanyard 113. The distal end 155 and angled minor end 154 of the shaft 111, may be secured by means of the retaining ring and short wire lanyard 113 threaded over or under the extendable beam 101. A safety device 114 secured to the extendable beam 101 may secure the short wire lanyard 113.

Alternatively, FIG. 14 shows wherein the locating pin 110 takes the form of a locking bolt 106, and wherein a distal end 155 of the shaft 115 is secured with a nut 117 and interfacing washer 116. A split pin 118 may go through the distal end 155 of the shaft 115 to prevent unscrewing of the nut 117. The locking bolt 106 in accordance with this further embodiment may be used to more permanently interface the bracing frame 104 to the fixed beam portion 101B, and the rear brace 129 between the bracing frame 104 and the fixed beam portion 101B.

As shown in FIG. 9, a distal end of the telescopic beam portion 101A may support a rope guide attachment bracket 105. The rope guide attachment bracket 105 may comprise a pair of plates secured either side of the distal end of the telescopic beam portion 101A and have a locking pin 110 inserted through corresponding holes thereof and comprising an access rope guide thereby.

As shown in FIG. 8, the telescopic beam portion 101A and the fixed beam portion 101B may comprise interfacing hour-glass cross-sectional profiles which enhance structural integrity, prevent rotation between the respective proximal and distal portions, and provide flat surfaces 156 for insertion of the locating pins 110 therethrough.

Figure 6:
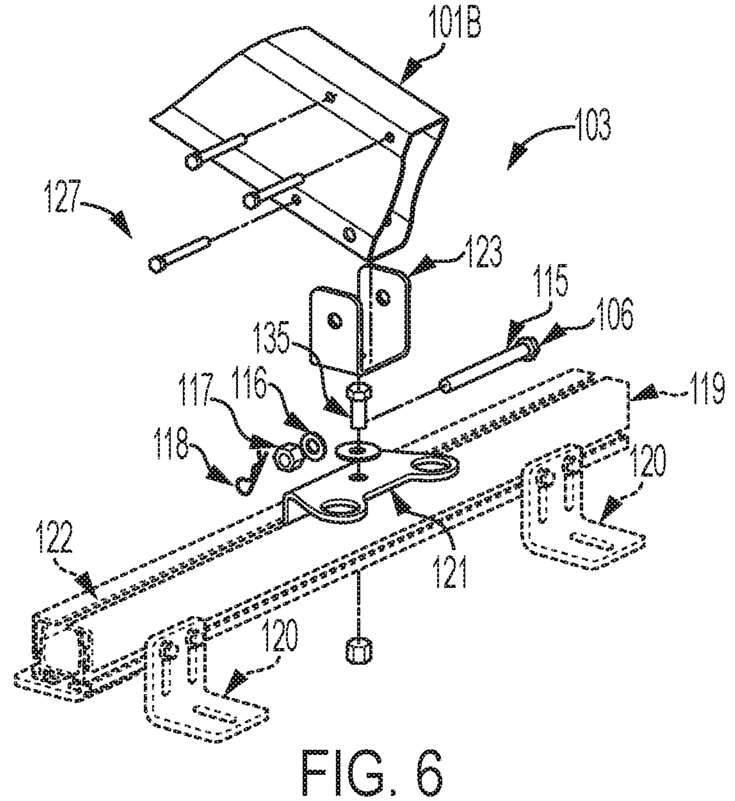
FIG. 6 shows an exploded perspective view of a rear mount in accordance with an embodiment.

FIGS. 6 and 7 show respective rigid guide rail type rear mounts 103 in accordance with respective embodiments of low profile and conventional profile rigid rails. The rear mounts 103 may engage the respective rigid guide rail types 119 secured to the surface 102 by fixing brackets 120 at pre-determined intervals.

A right-angled mounting plate 121 may engage through the open guide channels 122 in the respective rigid guide rail types 119 therealong, and be attached to a proximal end of the extendable beam 101B by means of a swivel bracket 123. A bolt fastener 135 may secure the swivel bracket 123 to the mounting plate 121 by being inserted through the collocating central holes therein. The bolt fastener 135 may further have a flat washer and a locknut.

The mounting plate 121 may further engage at various positions along the respective rigid guide rail types 119, for locating and adjusting the extendable needle davit assembly 100 via the swivel bracket 123. A locking bolt 106 may secure the swivel bracket 123 to the proximal end of the fixed beam portion 101B by being inserted through the collocating holes therein. The locking bolt 106 may further have an interfacing washer 116, a nut 117 and a split pin 118.

FIG. 7 shows the extendable needle davit assembly 100 comprising a rear connection bracket 124 defining primary rear attachment apertures 125, for tethering conventional safety hardware such as carabiners and lanyards.

Figure 10:
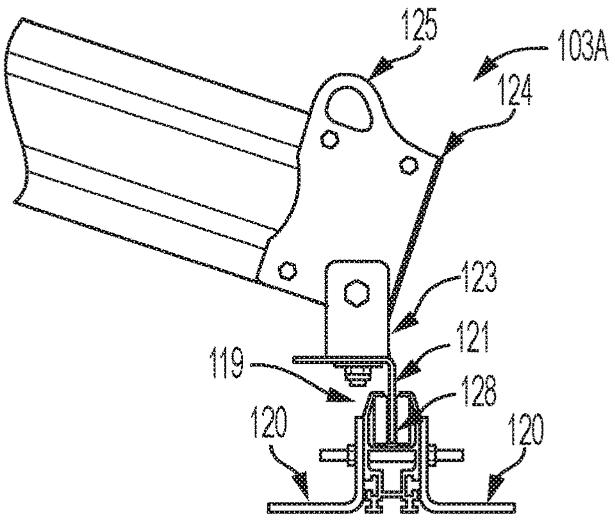
FIG. 10 shows a symmetrical side view of a rear mount in accordance with an embodiment.
Figure 11:
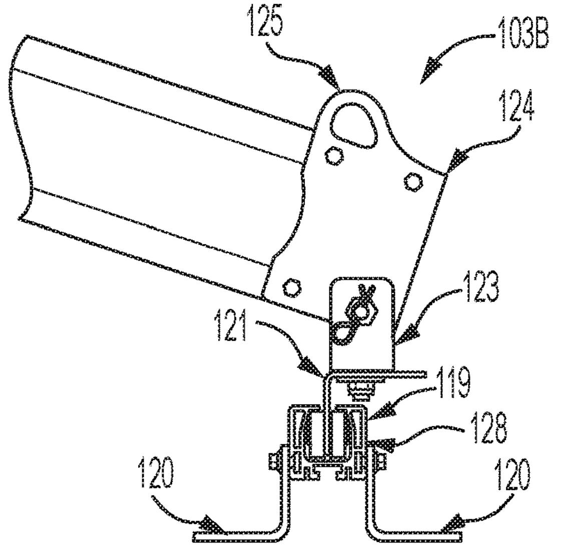
FIG. 11 shows a symmetrical side view of a rear mount in accordance with a further embodiment.

Different types of rear mounts 103 for various mounting options to a surface 102 are shown in FIGS. 10 to 12.

FIG. 10 shows details of a rear mount 103A mounting option shown in FIG. 7, and may be similar to the rear mount 103B, but wherein the rigid guide rail type 119 defines a conventional profile as compared to the low profile as shown in FIG. 11.

FIG. 11 shows details of a rear mount 103B mounting option shown in FIG. 6, but further wherein the mounting plate 121 may be engaged by roller bearings 128 within the open guide channel 122 of the rigid guide rail type 119 defining a low profile.

FIG. 12 shows a further rear mount 103C wherein the swivel bracket 123 is affixed directly to a surface 102. For example, the swivel bracket 123 may be affixed directly to a concrete surface using a concrete anchor.

Figure 18:
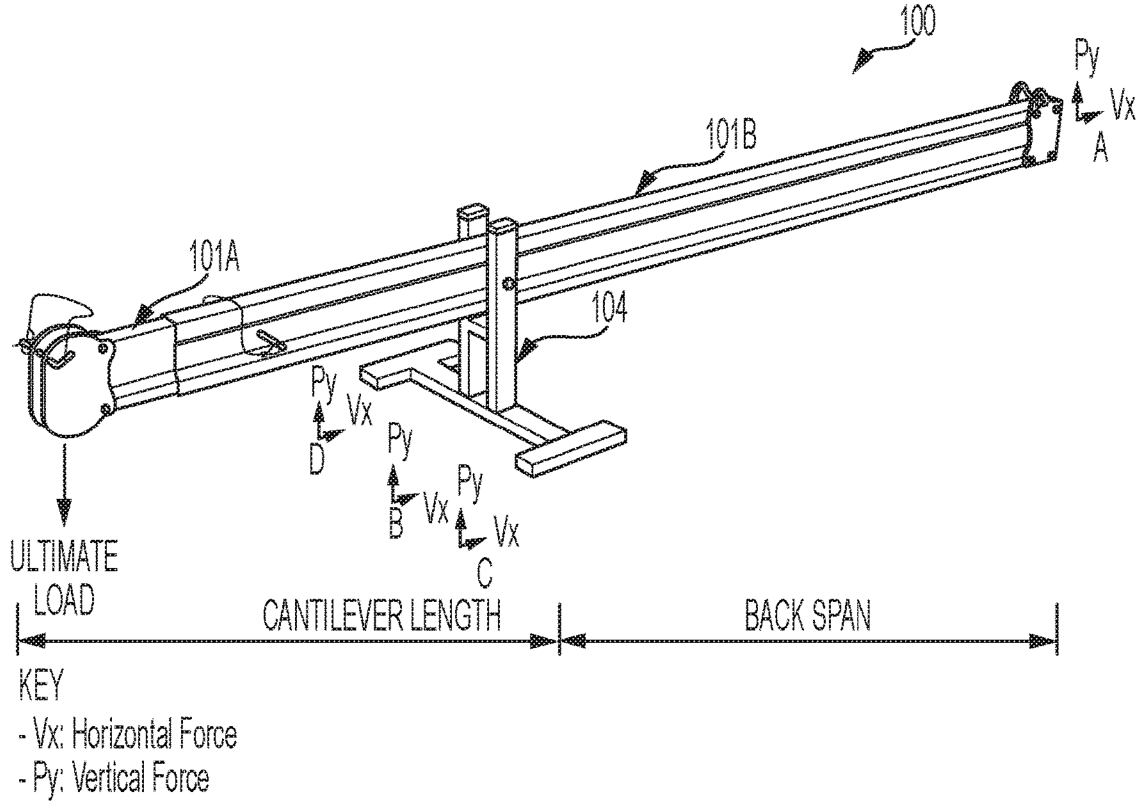
FIG. 18 shows an example embodiment of the davit assembly having a 400 mm high bracing frame.

FIG. 18 shows an exemplary embodiment of the extendable needle davit assembly 100, having a 400 mm high bracing frame 104. In this embodiment, the apparatus is devoid of the rear brace 129. The calculated vertical and horizontal forces for different cantilever lengths are tabulated as follows:

| FRAME | CANTILEVER | BACK SPAN | UTL | Point A | | Point B | | Point C | |
|---|---|---|---|---|---|---|---|---|---|
| HEIGHT | LENGTH (m) | (m) | LOAD | Vx (kN) | Py (kN) | Vx (kN) | Py (kN) | Vx (kN) | Py (kN) |
| 400 mm | 1000 | 1800 | 12 | 0.50 | −6.60 | −0.50 | 18.10 | −0.10 | 0.40 |
| | | 2400 | 12 | 0.70 | −4.90 | −0.60 | 16.50 | −0.10 | 0.40 |
| | | 3000 | 12 | 0.80 | −3.90 | −0.80 | 15.60 | −0.10 | 0.40 |
| 400 mm | 1200 | 1800 | 12 | 0.60 | −8.00 | −0.60 | 19.40 | −0.10 | 0.40 |
| | | 2400 | 12 | 0.80 | −5.90 | −0.70 | 17.50 | −0.10 | 0.40 |
| | | 3000 | 12 | 1.00 | −4.70 | −0.90 | 16.30 | −0.10 | 0.40 |
| 400 mm | 1500 | 2250 | 12 | 0.70 | −8.00 | −0.60 | 19.20 | −0.10 | 0.40 |
| | | 3000 | 12 | 0.90 | −6.00 | −0.80 | 17.30 | −0.10 | 0.40 |
| | | 3750 | 12 | 1.10 | −4.80 | −1.00 | 16.20 | −0.10 | 0.40 |

As further shown in FIG. 7, the mounting plate 121 may define secondary rear attachment apertures 126, for tethering carabiners and lanyards attached to a safety container, housing tools and equipment for rope access operations. Structural bolts 127 with flat washers and locknuts may secure the rear connection bracket 124 to a proximal end of the fixed beam portion 101B.

Figure 19:
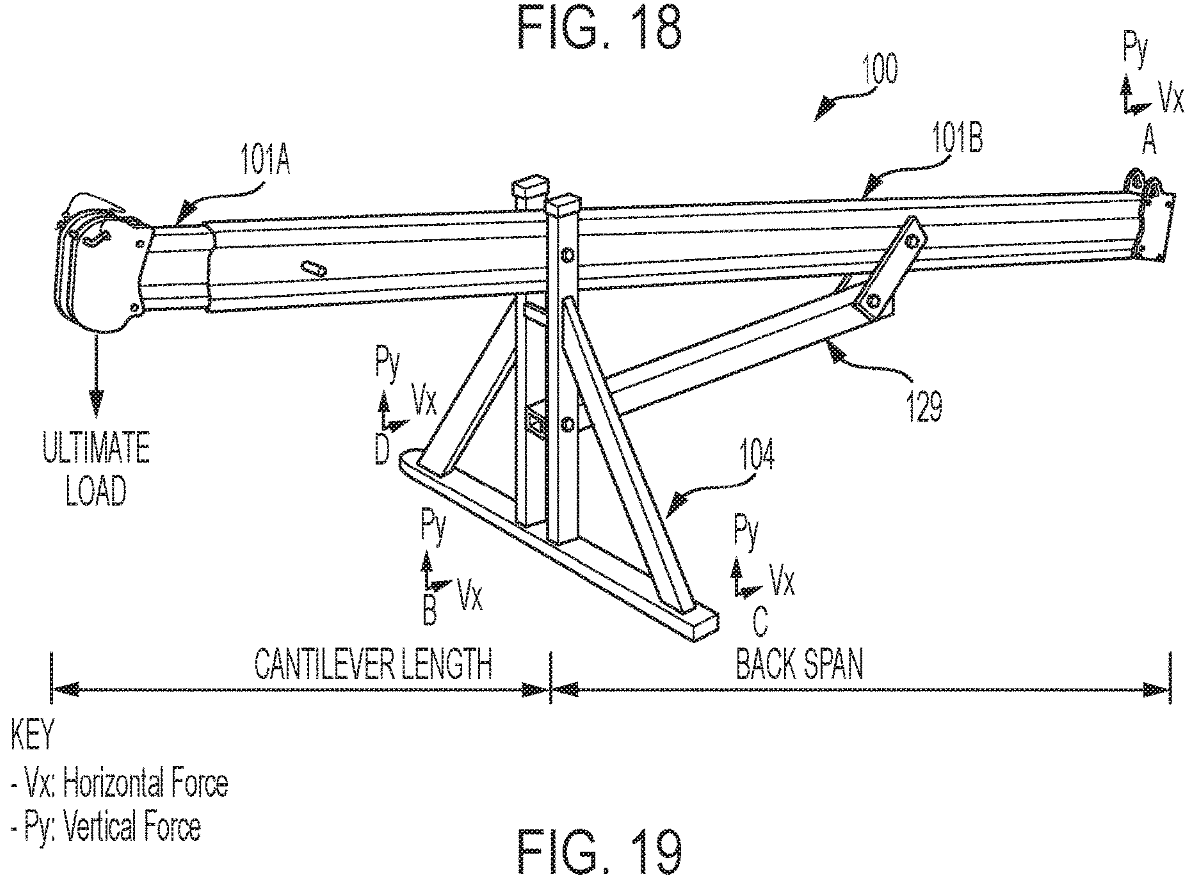
FIG. 19 shows an example embodiment of the davit assembly having an 800 mm high bracing frame.

FIG. 19 shows an embodiment of the extendable needle davit assembly 100, having an 800 mm high bracing frame 104. The calculated vertical and horizontal forces for different cantilever lengths are tabulated as follows:

| FRAME | CANTILEVER | BACK SPAN | UTL | Point A | | Point B | | Point C | |
|---|---|---|---|---|---|---|---|---|---|
| HEIGHT | LENGTH (m) | (m) | LOAD | Vx (kN) | Py (kN) | Vx (kN) | Py (kN) | Vx (kN) | Py (kN) |
| 800 mm | 1200 | 1800 | 12 | 7.30 | −7.20 | −7.30 | 17.60 | −0.10 | 1.00 |
| | | 2400 | 12 | 8.70 | −5.30 | −8.70 | 15.90 | −0.10 | 0.90 |
| | | 3000 | 12 | 10.00 | −4.10 | −10.00 | 14.90 | −0.10 | 0.90 |
| 800 mm | 1500 | 2250 | 12 | 7.70 | −7.10 | −7.70 | 17.60 | −0.10 | 1.00 |
| | | 3000 | 12 | 7.90 | −5.30 | −7.80 | 16.10 | −0.10 | 0.90 |
| | | 3700 | 12 | 11.30 | −4.10 | −11.20 | 15.10 | −0.30 | 0.90 |
| 800 mm | 1800 | 2700 | 12 | 12.60 | −7.10 | −12.60 | 17.60 | −0.10 | 1.00 |
| | | 3600 | 12 | 15.60 | −5.10 | −15.50 | 15.80 | −0.10 | 1.00 |
| | | 4500 | 12 | 17.70 | −3.90 | −17.60 | 14.80 | −0.10 | 0.90 |

Figure 20:
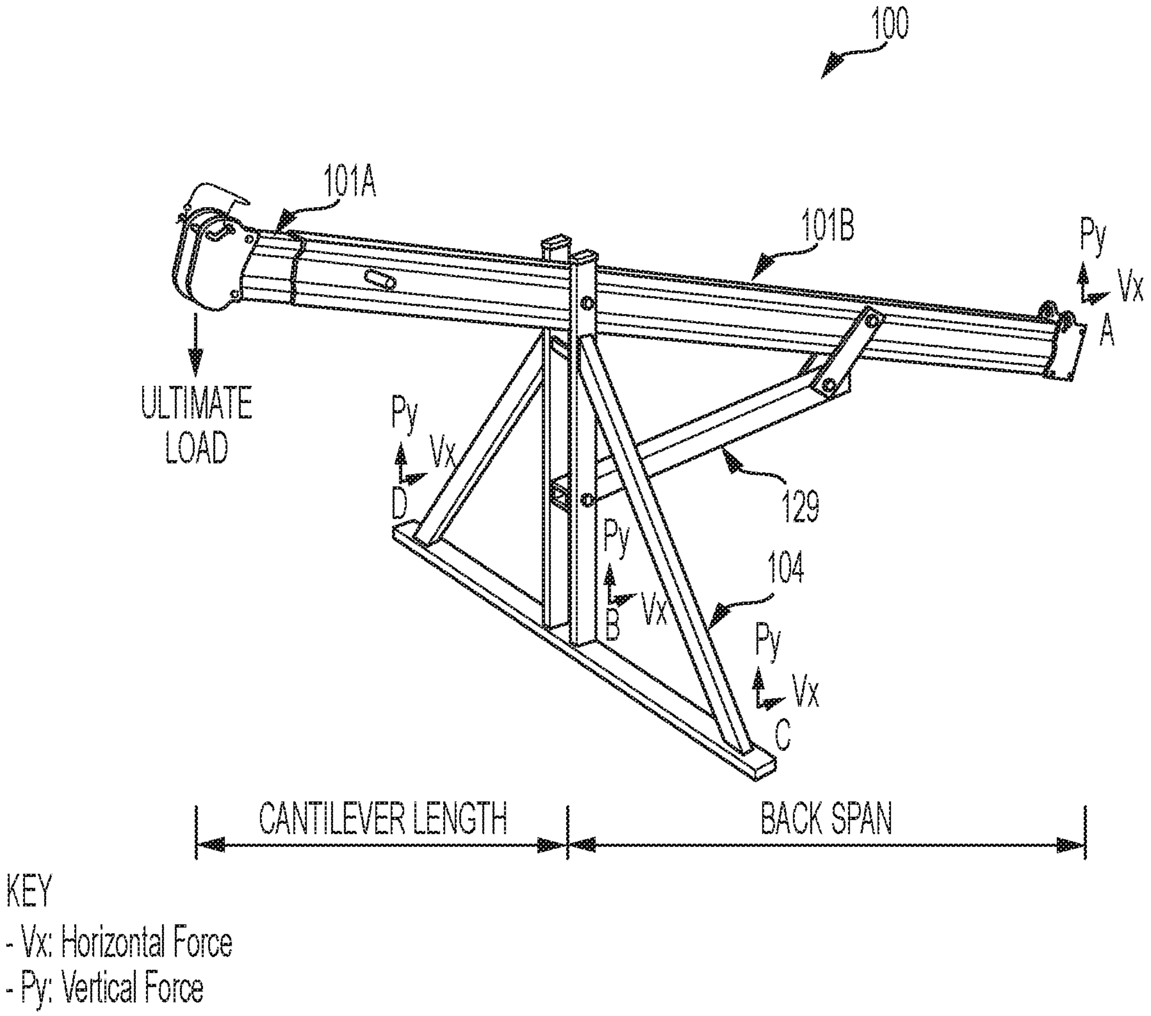
FIG. 20 shows an example embodiment of the davit assembly having a 1200 mm high bracing frame.

FIG. 20 shows an embodiment of the extendable needle davit assembly 100, having a 1200 mm high bracing frame 104. The calculated vertical and horizontal forces for different cantilever lengths are tabulated as follows:

| FRAME | CANTILEVER | BACK SPAN | UTL | Point A | | Point B | | Point C | |
|---|---|---|---|---|---|---|---|---|---|
| HEIGHT | LENGTH (m) | (m) | LOAD | Vx (kN) | Py (kN) | Vx (kN) | Py (kN) | Vx (kN) | Py (kN) |
| 1200 mm | 1200 | 1800 | 12 | 3.60 | −8.40 | −3.60 | 18.80 | 0.00 | 1.90 |
| | | 2400 | 12 | 4.80 | −6.50 | −4.80 | 17.20 | 0.00 | 0.90 |
| | | 3000 | 12 | 6.10 | −5.30 | −6.10 | 16.10 | 0.00 | 0.90 |
| 1200 mm | 1500 | 2250 | 12 | 3.40 | −7.00 | −3.40 | 17.80 | 0.00 | 0.90 |
| | | 3000 | 12 | 4.50 | −5.40 | −4.50 | 16.30 | 0.00 | 0.90 |
| | | 3700 | 12 | 5.40 | −4.30 | −5.30 | 15.40 | −0.10 | 0.80 |
| 1200 mm | 1800 | 2700 | 12 | 4.60 | −7.60 | −4.60 | 18.40 | 0.00 | 1.00 |
| | | 3600 | 12 | 7.00 | −5.60 | −7.00 | 16.50 | −0.10 | 0.90 |
| | | 4500 | 12 | 9.20 | −4.30 | −9.20 | 15.40 | −0.10 | 0.90 |

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed, as obviously many modifications and variations are possible in view of the above teachings. The embodiments were chosen and described in order to best explain the principles of the invention and its practical applications, thereby enabling others skilled in the art to best utilise the invention and various embodiments with various modifications as are suited to the particular use contemplated. It is intended that the following claims and their equivalents define the scope of the invention.

The invention claimed is:

1. An extendable needle davit assembly comprising:

an extendable beam inclined from an anchor; and an intermediate lateral bracing frame, wherein the extendable beam comprises:

a fixed beam portion between the anchor and the intermediate lateral bracing frame, wherein an upper end of the bracing frame is attached to a distal attachment point of the fixed beam portion, and a telescopic beam portion, wherein the telescopic beam portion slidably receivable within a distal end of the fixed beam portion and extendable from and telescopingly fixed to the distal end of the fixed beam portion beyond the intermediate lateral bracing frame, and wherein a lower portion of the bracing frame is attached to a proximal attachment point of the fixed beam portion by means of a rear brace and wherein the anchor is a swivel anchor.

2. The davit assembly as claimed in claim 1, wherein the rear brace has a fixed length.

3. The davit assembly as claimed in claim 1, wherein the upper end of the bracing frame is bifurcated and open-ended and wherein the fixed beam portion inserts between the bifurcated portions at the distal attachment point.

4. The davit assembly as claimed in claim 3, wherein a locating pin fits through the bifurcated portions and the fixed beam portion therebetween.

5. The assembly as claimed in claim 1, wherein a proximal end of the brace is bifurcated and open-ended and wherein the fixed beam portion slots in between bifurcated portions at the proximal attachment point.

6. The assembly as claimed in claim 5, wherein a locking pin fits through the bifurcated portions and the fixed beam portion therebetween.

7. The assembly as claimed in claim 1, wherein the lower portion of the bracing frame is bifurcated and wherein a distal end of the rear brace inserts between bifurcated portions thereof for attachment.

8. The davit assembly as claimed in claim 7, wherein a locating pin fits through the bifurcated portions and the distal end of the rear brace therebetween.

9. The davit assembly as claimed in claim 1, wherein the bracing frame, rear brace and fixed beam portion are attached using three locating pins.

10. The davit assembly as claimed in claim 9, wherein attachments between the bracing frame, rear brace and fixed beam portion comprise bifurcated portions, between which respective portions of the bracing frame, rear brace and fixed beam portion insert and are retained with respective locating pins.

11. The davit assembly as claimed in claim 1, wherein the bracing frame comprises a base member orientated orthogonally with respect to the extendable beam, and wherein the base member is not anchored so that the bracing frame can be lifted with the extendable beam, as the extendable beam swivels with respect to the anchor.

12. The davit assembly as claimed in claim 1, wherein the telescopic beam portion is slidable with respect to the fixed beam portion, between an extended position and a retracted position and wherein, in the retracted position, a proximal end of the telescopic beam does not cross the distal attachment point.

13. The davit assembly as claimed in claim 12, wherein the telescopic beam portion and the fixed beam portion comprise a series of apertures, which collocate at more than one position of the telescopic beam portion with respect to the fixed beam portion for a locating pin.

14. The davit assembly as claimed in claim 1, wherein the telescopic beam portion is slidable with respect to the fixed beam portion, between an extended position and a retracted position and wherein, in the retracted position a proximal end of the telescopic beam crosses the distal attachment point.

15. The davit assembly as claimed in claim 14, wherein the telescopic beam portion and the fixed beam portion comprise a series of apertures, which collocate at more than one position of the telescopic beam portion with respect to the fixed beam portion for a locating pin.

16. The davit assembly as claimed in claim 14, wherein, in the extended position, the proximal end of the telescopic beam crosses the distal attachment point.

17. The davit assembly as claimed in claim 16, wherein the telescopic beam portion and the fixed beam portion comprise a series of apertures which collocate at more than one position of the telescopic beam portion with respect to the fixed beam portion for a locating pin, and wherein the telescopic beam portion comprises a further series of apertures for a further locating pin which fits through the upper end of the bracing frame, the fixed beam portion and the telescopic beam portion at the distal attachment point.

18. The davit assembly as claimed in claim 1, wherein the rear brace is orthogonal with respect to the lateral bracing frame.

19. The davit assembly as claimed in claim 1, further comprising a locating pin and wherein the locating pin comprises a shaft defining a major straight section and an angled minor end.

20. The davit assembly as claimed in claim 19, wherein the straight section of the locating pin fits through transversely orientated collocating apertures through the fixed beam portion and the telescopic beam portion.

21. The davit assembly as claimed in claim 19, wherein a distal end of the locating pin shaft is secured using a locking pin and retaining ring.

22. The davit assembly as claimed in claim 21, wherein the retaining ring and angled end of the locating pin shaft are secured by means of a short wire lanyard, threaded over or under the fixed beam portion and the telescopic beam portion.

23. The davit assembly as claimed in claim 1, wherein a distal end of the telescopic beam portion supports a rope guide attachment bracket.

24. The davit assembly as claimed in claim 23, wherein the rope guide attachment bracket comprises a pair of plates secured either side of the distal end of the telescopic beam portion.

25. The davit assembly as claimed in claim 23, wherein the rope guide attachment bracket has a locating pin inserted through corresponding apertures thereof.

26. The davit assembly as claimed in claim 1, wherein a proximal end of the fixed beam portion is anchored from a rear mount, and wherein the rear mount engages a rigid rail secured to a surface.

27. The davit assembly as claimed in claim 26, wherein a mounting plate engages the rigid rail, and is attached to a proximal end of the fixed beam portion by means of a swivel bracket.

28. The davit assembly as claimed in claim 27, wherein the mounting plate is right-angled.

29. The davit assembly as claimed in claim 27, wherein the mounting plate can engage at various positions along the rigid rail for locating and adjusting the extendable needle davit assembly by means of the swivel bracket.

30. The davit assembly as claimed in claim 29, wherein the mounting plate is engaged by roller bearings within the rigid rail.

31. The davit assembly as claimed in claim 1, wherein the fixed beam portion and telescopic beam portion comprise hour-glass cross-sectional profiles.

32. The davit assembly as claimed in claim 1, further comprising a rear connection bracket defining primary rear attachment apertures.

33. The davit assembly as claimed in claim 32, further comprising a swivel bracket defining secondary rear attachment apertures.

34. A method of adjusting the extendable needle davit assembly as claimed in claim 1, the method comprising adjusting the longitudinal offset of the telescopic beam portion with respect to the fixed beam portion, without repositioning the bracing frame.

35. The method as claimed in claim 34, further comprising the apparatus as claimed in claim 13, wherein the method comprises manipulating only the locating pin without manipulating any other locating pins to adjust the longitudinal offset.

36. The method as claimed in claim 34, further comprising the apparatus as claimed in claim 17, wherein the method further comprises manipulating the locating pin and the further locating pin to adjust the longitudinal offset.

37. A method of assembling and constructing the extendable needle davit assembly as claimed in claim 1, the method comprising:

attaching a proximal end of the fixed beam portion to the anchor;

inserting a proximal end of the telescopic beam portion into a distal end of the fixed beam portion;

attaching the fixed beam portion and the bracing frame at the distal attachment point;

attaching the rear brace between the lower portion of the bracing frame and the proximal attachment point of the fixed beam portion;

swivelling the davit assembly around the anchor towards a building parapet or structure edge, such that the bracing frame lifts and moves with the extendable beam into position; and extending the telescopic beam portion with respect to the fixed beam portion without repositioning the bracing frame, such that a distal end of the telescopic beam portion extends over the building parapet or structure edge.

* * * * *